United States Patent [19]

Kampfer et al.

[11] 4,053,767

[45] Oct. 11, 1977

[54] METHOD AND APPARATUS FOR STABILIZING SIGNALS IN RADIOACTIVE WELL LOGGING TOOLS

[75] Inventors: John G. Kampfer; Lucian A. Ingram, both of Houston, Tex.

[73] Assignee: Halliburton Company, Duncan, Okla.

[21] Appl. No.: 716,905

[22] Filed: Aug. 23, 1976

[51] Int. Cl.² .................... G01D 18/00; G01V 5/00
[52] U.S. Cl. .................................. 250/252; 250/262; 250/367
[58] Field of Search .................. 250/252, 262, 367

[56] References Cited

U.S. PATENT DOCUMENTS

| | | | |
|---|---|---|---|
| 2,956,165 | 10/1960 | Johnson | 250/262 X |
| 3,225,195 | 12/1965 | Scherbatskoy | 250/252 X |
| 3,270,205 | 8/1966 | Ladd et al. | 250/362 X |
| 3,829,686 | 8/1974 | Schultz | 250/262 X |
| 3,916,685 | 11/1975 | Paap et al. | 250/262 X |

*Primary Examiner*—Davis L. Willis

*Attorney, Agent, or Firm*—Floyd A. Gonzalez; John H. Tregoning

[57] ABSTRACT

The present invention presents a method and apparatus for stabilizing signals in radioactive well logging tools including providing in the tool a main scintillating crystal and photomultiplier tube for detecting radiation induced in the borehole by a source of radiation, and a reference crystal, including a source of mono-energetic radiation, for producing continuous reference signals of a predetermined energy level. The reference signals are monitored and the spectrum is stabilized to correct for drift of the data signals introduced by the photomultiplier tube and the data transmission system. The preferred mono-energetic reference signals are selected to appear in the energy spectrum at a level which minimizes error. An electronic circuit at the surface provides a correction signal for adjusting the gain of a data signal amplifier responsive to changes in the reference signal, thereby correcting for drift in the data signal.

20 Claims, 4 Drawing Figures

METHOD AND APPARATUS FOR STABILIZING SIGNALS IN RADIOACTIVE WELL LOGGING TOOLS

BACKGROUND OF THE INVENTION

This invention relates to stabilizing signals from a radioactive well logging tool in which data pulses generated responsive to radiation impinging on the scintillation crystal from a submerged formation are analyzed to determine both the count rate and the energy content of the radiation being detected.

It is well known that in oil and gas wells, physical characteristics of the formations surrounding the well and the chemical content of formations and fluids in the formations can be determined from radiation emanating from the formation. The radiation detected may be either radiation naturally originating in the formation, or may be induced radiation caused by irradiating the formation during a well logging operation.

It is also well known that radiation from a submerged formation may be detected by use of a scintillation crystal which gives off light pulses proportional to the energy of the radiation absorbed by the crystal. The light pulses are then detected by a light detector which typically produces electrical pulses which are proportional to the intensity of the light pulses detected. The electrical pulses are then transmitted to the surface over a transmission system where the number and height of the electrical pulses are analyzed to determine the characteristics of the formations and the fluids contained therein.

The electrical pulses received for analysis at the surface will be affected by errors introduced by the light detection system and the transmission system. In the past, reference pulses either naturally appearing in or introduced into the electrical pulse spectra have been used to correct the electrical pulses before they are analyzed. For instance, in U.S. Pat. No. 3,829,686 a particular known energy peak occurring in the spectra of the radiation detected from the subsurface formation is used as a reference. The peak chosen in this instance is the 2.22 MEV hydrogen gamma ray energy spectrum peak.

In U.S. Pat. No. 3,916,685 the reference pulses are generated by an oscillator in the logging tool and impressed on the transmission system with the electrical pulses produced by the light detector. However, since the reference pulses are produced independent of the light detector, the generated reference pulses will not include errors caused by the light detector itself. Also in U.S. Pat. No. 3,916,685, it is suggested that the scintillation crystal may be doped with an alpha emitting isotope to provide to the light detector reference light pulses to give the desired reference electrical pulses.

It has been found when the scintillation crystal itself is doped with an alpha emitter, that the resulting light pulses are attenuated as they travel through the scintillation crystal. This effect smears the energy content information of the data signal reference pulses such that a distinct peak of reference pulses is not formed.

The present invention provides a scintillation crystal radiation detector for use in oil well logging having a main scintillation crystal and a light detector for detecting scintillations in the crystal due to radiation from submerged formations, and includes a reference crystal embedded in the main crystal for providing reference light pulses to the light detector. The reference crystal is doped with a reference source of mono-energetic radiation, and is placed in the main crystal such that scintillations in the reference crystal are detected by the light detector directly and separately from the scintillation in the main crystal.

The preferred light detector of the present invention is a photomultiplier tube which provides a data signal having electrical pulses proportional to the intensity of light flashes in the main crystal and the reference crystal.

The electrical pulses are transmitted to the surface where the subject equipment, including an electronic circuit which detects any shift in the peak of the reference pulses, provides a feedback signal which adjusts the gain of an amplifier for correcting drift in the data signal responsive to drift in the reference signal.

In the particular embodiment illustrated herein, single channel analyzers are used to detect and record that portion of the spectrum indicative of hydrogen and chlorine. The energy of the reference source is chosen to be in a part of the spectrum which will not be masked by background radiation from the subsurface formations; the preferred range being from about 4.5 to about 6.5 MEV.

The surface equipment additionally includes electronic circuits to select and display preselected portions of the spectrum, and an electronic circuit which subtracts from the corrected spectrum the known value of the reference pulses.

Thus, this invention provides a well logging tool having a clearly delineated reference peak in the transmitted data signal which allows the data signal to be corrected for drift in the light detector, the supply voltage to the light detector, and the data transmission system. The reference signal is provided by a source of mono-energetic radiation in a reference crystal which is embedded in the main crystal of a scintillation crystal detector. The gamma equivalent energy and count rate of the reference crystal are selected to produce a reference peak in the data signal spectrum such that the peak is not masked by background pulses and the reference crystal is arranged in the main crystal such that the reference pulses are unattenuated by the main crystal.

DESCRIPTION OF THE INVENTION

Figure 1:
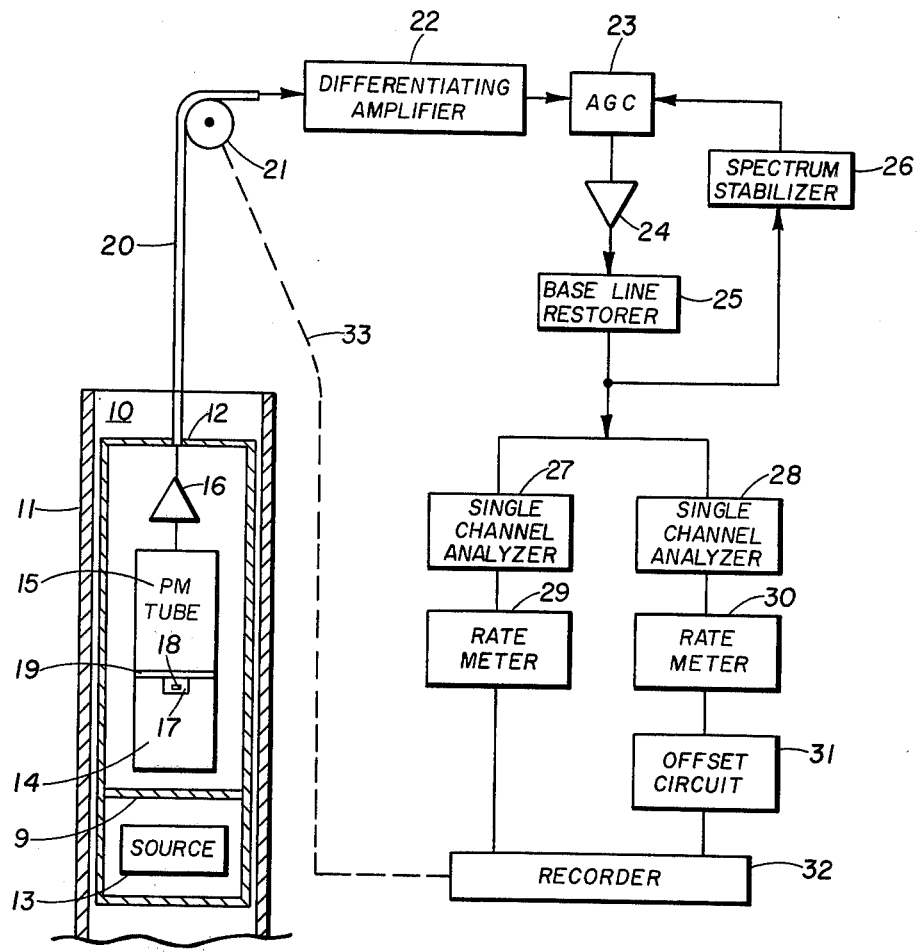
FIG. 1 is a simplified block diagram of a well logging system including the invention.

FIG. 1 presents a diagramatic representation of a well logging system incorporating the present invention. The well logging system includes well logging sonde 12 suspended by cable 20 in well bore 10 which is typically lined with a steel casing 11.

As is well known by those skilled in the art, the submerged formations are irradiated by a source of radiation 13 located in the well logging sonde. Radiation emanating from the formation as a result of the irradiation is detected by a scintillation detector comprising a scintillation crystal 14 and a light sensor, preferably a photomultiplier tube 15.

The illustrative embodiment desclosed to describe the invention includes a continuous type neutron source for source 13; the preferred source being an Americium Beryllium neutron source. It will be understood by those skilled in the art that the invention is likewise usable in a pulsed neutron type logging apparatus.

The source 13 is isolated from the scintillation crystal 14 by a barrier 9 as shown such that the crystal 14 will be irradiated only by radiation emanating from the formation.

The radiation to be detected in the illustrative example are gamma rays resulting from inelastic scattering of the neutrons and capture gamma rays. The gamma rays thus emanating from the surrounding formations cause light flashes in the main scintillation crystal 14. These light flashes are detected by a light detector such as a photomultiplier tube 15 which is optically coupled to the scintillation crystal 14 by a light transmitting means such as a glass lens piece 19. The preferred crystal 14 of the disclosed embodiment is thallium acivated sodium iodide.

The photomultiplier tube 15 generates an electrical pulse whose height is proportional to the intensity of a light flash impinging on the photocathode of the tube.

The intensity of the light flashes induced in the scintillation crystal 14 is proportional to the energy of the corresponding gamma rays which induce the light flashes. Additionally, the number and energy of the gamma rays emanating from the surrounding formation is dependent upon the characteristics and elements of the surrounding formation and of the fluid in the formation. Thus, by analyzing the height and number of electrical pulses generated by the photomuliplier tube, it is possible to determine something about the formation and the elements of the fluid present in the formation.

It can be seen that if the data signal is attenuated or subject to drift, then the pulse height of the electrical pulses will change, and an accurate determination of the desired characteristics cannot be made.

In the present invention a reference crystal 17 is embedded in the main scintillation crystal 14 such that one side of the reference crystal is adjacent the photomultiplier tube 15. The reference crystal 17 is a scintillation crystal which has been doped with a mono-energetic source of radiation 18. The radiation from radiation source 18 causes the reference crystal 17 to give off light flashes of a predetermined intensity or gamma equivalent energy. These flashes are detected by the photomultiplier tube 15 and the resultant reference electrical pulses are transmitted to the surface as part of the data signal.

The reference crystal 17 may be thallium activated sodium iodide, and the source 18 preferred is a source of alpha particles, preferably Americium 241.

The data signal from the photomultiplier tube 15, including the data pulses and the reference pulses, is amplified by the amplifier 16 and transmitted by an appropriate conductor in the cable 20 to the surface equipment. The surface equipment includes a pulse shaping electronic circuit, such as a differentiating amplifier 22 which produces well defined pulses proportional to pulses in the data signal received at the surface over cable 20.

These pulses are further amplified by amplifier 24 whose gain is controlled by an automatic gain control circuit 23. The data signal is then passed through a base line restorer circuit 25. As will be appreciated by those skilled in the art, the base line restorer is designed to restore the undershoot of the pulses in the data signal to a dc baseline. This is done to reduce the pile-up distortion caused by pulses falling on the tail of previous pulses, and thus allows precision analysis of signals at a much higher count rate.

Such a baseline restorer is the Model 438 baseline restorer sold by Ortec, Inc. of Oak Ridge, Tennessee.

The output of the base line restorer 25 is supplied to a spectrum stabilizer circuit 26 which provides a feedback signal to the automatic gain control circuit 23 thereby adjusting the gain of amplifier 24. The spectrum stabilizer includes a single channel analyzer which detects shifts of a selected spectral peak, and generates a compensating signal. In this case, the window of the spectrum stabilizer 26 is adjusted to straddle the spectral peak in the data signal provided by the reference crystal 17. If this spectral peak should drift, the spectrum stabilizer 26 generates a compensating signal to the automatic gain control circuit 23, thereby adjusting the gain of amplifier 24 to adjust the data spectrum until the spectral peak is again at its proper energy level.

A suitable spectrum stabilizer is the NC-20 spectrum stabilizer sold by Harshaw Chemical Company of Solon, Ohio.

In the illustrative embodiment, the stabilized data signal is supplied to a pair of single channel analyzers 27 and 28, which are adjusted to provide windows which pass those pulses in the data signal spectrum indicative of the elements of interest. Single channel analyzer 27 passes pulse height indicative of hydrogen, and single channel analyzer 28 passes pulse heights indicative of chlorine.

The rate meters 29 ad 30, as will be appreciated by those skilled in the art, includes an integrator circuit which integrates the pulses passed by single channel analyzer 27 and 28 respectively to provide an appropriate analog signal to the recorder 32. The rate meters 29 and 30 may also include an indicating means such as a volt meter or an oscilloscope to provide an indication of these analog signals.

In the illustrative embodiment, the spectral peak of the reference pulses are in the chlorine portion of the data signal spectrum and thus are passed by the single channel analyzer 28. For this reason an offset circuit 31 is provided to substrate the value of this known peak from the chlorine signal before recording. Offset circuit 31 is shown between the rate meter 30 and the recorder 32, but could be incorporated into the circuitry of the rate meter 30.

The recorder 32 is a conventional recorder and includes a mechanical or electrical-mechanical link 33 to sheave 21 such that the recorder will advance a recording medium in synchronsim with the movement of the logging sonde 12 through the borehole 10.

Figure 2:
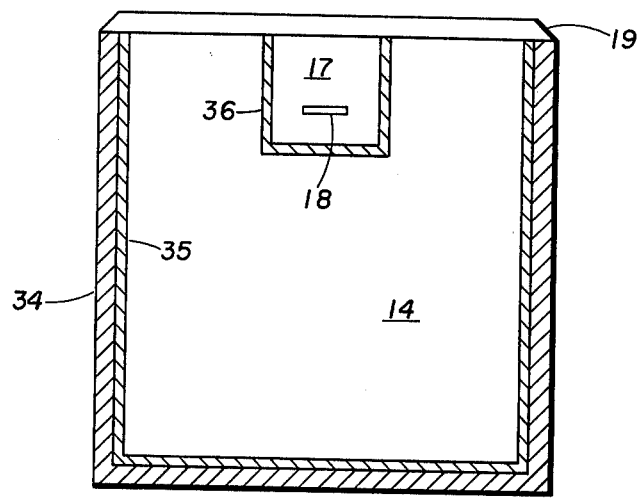
FIG. 2 is a cross-sectional view of the scintillation crystal portion of the invention showing the main crystal and the embedded reference crystal.
Figure 3:
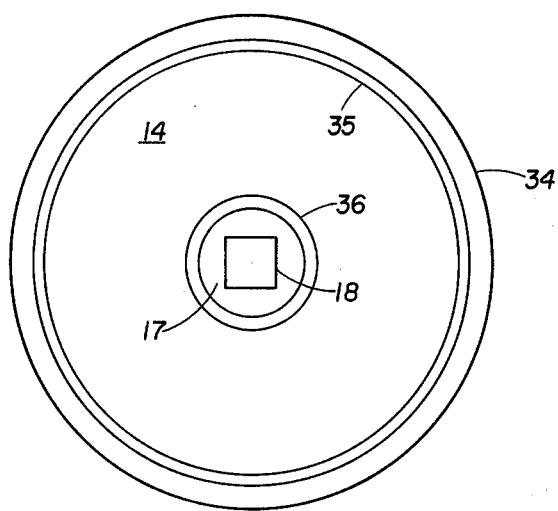
FIG. 3 is an end view of the scintillation crystal portion of the invention further showing the arrangement of the reference crystal within the main crystal as viewed from the end adjacent to the light sensing photomultiplier tube.

FIGS. 2 and 3 show the details of the main scintillation crystal 14 and reference crystal 17. The main crystal 14 is located in a cylindrical housing 34 which is closed at one end. The reference crystal 17 is embedded in the main crystal 14 at the end opposite the closed end as shown. As the crystals are hygroscopic, the open end of the housing is sealed by a light transmitting lens 19 to protect the crystals from moisture and to transmit light flashes in the crystals to the cathode of the photomultiplier tube 15.

A layer 35 of light reflective material such as magnesium oxide is coated on the walls and the closed end of the cylindrical housing 34 to reflect the light pulses induced in the main scintillation crystal 14 such that the light pulses will be reflected into the photomultiplier tube 15.

A layer 36 of light reflective material is also placed between the main crystal 14 and the reference crystal 17 such that scintillations in the reference crystal 17 caused by the source 18 will be reflected into the photomultiplier tube. The thickness of reflective layers 35 and 36 are greatly exaggerated in the figures for the sake of clarity.

The main crystal 14 and the reference crystal 17 in the configuration shown in FIGS. 2 and 3 have been fabricated at the applicants' request by the Harshaw Chemical Company of Solon, Ohio.

It has been found that attenuation of the light pulses from a reference crystal when the reference light pulses are piped through a main crystal to a photomultiplier tube results in the smearing of the reference peak such that correction of the data signal is uncertain.

In the configuration of the present invention, the radiation of the mono-energetic source 18 is absorbed in the reference crystal 17, giving off corresponding light pulses. These light pulses are coupled, both directly and by reflection from layer 36 into the photomultiplier tube 15. This results in a well shaped reference gamma energy equivalent peak in the data signal spectrum.

The placing of the reference crystal in the main crystal as shown also provides that both the reference light pulses and the data light pulses will be similarly attenuated by the light transmitting lens 19, thus insuring that the corrected data signal will be corrected for the effects of the lens 19.

Figure 4:
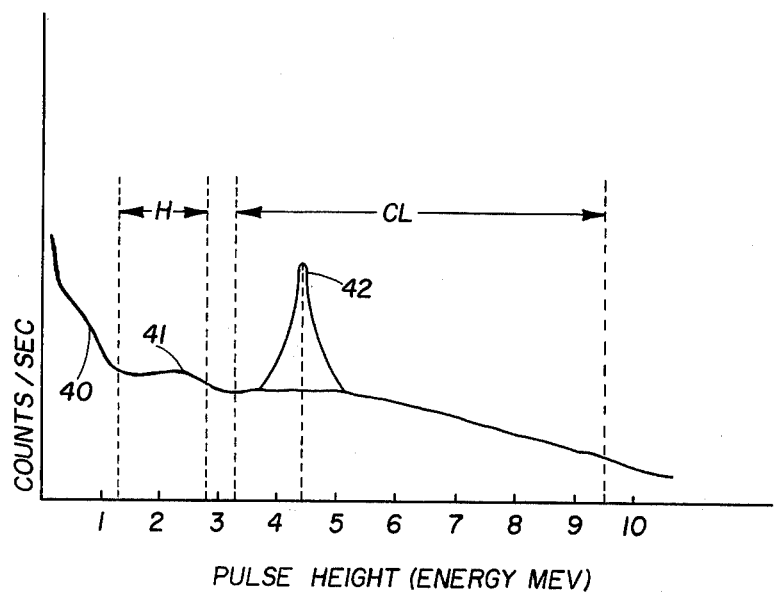
FIG. 4 is a representation of a typical pulse count versus pulse height curve, including a representation of the peak in the spectrum due to the reference pulses from the reference crystal.

FIG. 4 illustrates a data signal spectrum 40 displayed as counts per second versus pulses height, with the height of the pulses being representative of the energy in MEV of the radiation detected. In the illustrative embodiment of the invention, the single channel analyzers 27 and 28 provide two windows for the examination of those portions of the spectrum representative of hydrogen and chlorine respectively. The preferred window for hydrogen provided by single channel analyzer 27 extends from about 1.30 to about 2.92 MEV. The preferred window for chlorine provided by single channel analyzer 28 extends from about 3.43 to about 9.5 MEV.

When hydrogen is present in the borehole, indicating oil or gas or water, there is an increase in the counting rate of pulse heights in the hydrogen window illustrated by peak 41 at 2.22 MEV. When the chlorine count rate also increases, it is an indication that salt water is present in the formation. In U.S. Pat. No. 3,829,686 the 2.22 MEV hydrogen gamma ray energy spectrum peak itself is used as a reference. It can be seen by the spectrum plot that the peak 41 is partially masked in that it appears in that part of the spectrum having a higher background count rate.

Peak 42 of FIG. 4 illustrates the peak produced by the reference crystal 17. This peak is easily distinguished, and because of the placement of the reference crystal 17 in the main crystal 14 produces a well formed peak. The preferred gamma equivalent energy of the reference peak is about 4.5 MEV. However, the reference crystal 17 and source 18 may be designed such that the gamma equivalent energy may be at some predetermined point from about 4.5 to about 6.5 MEV.

The exact gamma equivalent energy of the peak of reference crystal 17 may easily be determined. The spectrum stabilizer 26 is then adjusted to straddle the peak 42 so that any drift in the peak will adjust the automatic gain control 23 to shift the spectrum until the peak 42 appears at the proper energy level in the spectrum. Offset circuit 31 is then adjusted to remove the contribution to the chlorine count rate caused by reference pulse peak 42.

The foregoing embodiments have been shown and described as illustrative embodiments of the invention. However, changes and modifications to these embodiments will be apparent to those skilled in the art, and may be made without departing from this invention in its broader aspects. The appended claims are intended to cover the invention and such of these changes and modifications as fall within the true spirit and scope of this invention.

What is claimed is:

1. An apparatus for measuring radiation in a borehole comprising:
   a main scintillation crystal capable of scintillating responsive to the radiation to be measured for giving off a first set of light flashes whose intensity is proportional to the intensity of said radiation;
   a reference scintillation crystal embedded in one end of said main crystal, said reference scintillation crystal having a source of mono-energetic radiation embedded therein for inducing in said reference scintillation crystal a second set of light flashes of a predetermined intensity;
   light transmitting means adjacent said one end of said main scintillation crystal arranged for transmitting said first set of light flashes directly from said main scintillation crystal and for transmitting said second set of light flashes directly from said reference scintillation crystal;
   light sensing means optically coupled to said light transmitting means for generating electrical pulses responsive to the light flashes of said first and second set of light flashes, wherein the height of each of said generated electrical pulses is proportional to the intensity of a respective light flash of said first and second set of light flashes; and
   electrical data transmitting means electrically connected to said light sensing means for transmitting said electrical pulses to a point removed from said borehole.

2. The apparatus of claim 1 further comprising a layer of reflective material between said main scintillation crystal and said embedded reference scintillation crystal for reflecting said second set of light flashes directly from said reference crystal through said light transmitting means to said light sensing means.

3. The apparatus of claim 1 further comprising:
   amplifier means electrically connected to said electrical data transmitting means for amplifying said electrical pulses to provide an amplified data signal;
   automatic gain control means for adjusting the gain of said amplifier means responsive to an electrical feedback signal;
   spectrum stabilizer means including a signal channel analyzer operable to sense the height of the electrical pulses generated responsive to said second set of light flashes, and for generating an electrical feedback signal responsive to changes in said sensing pulse height; and electrical circuit means for electrically transmitting said generated electrical feedback signal to said automatic gain control means for adjusting the gain of said amplifier means until the electrical pulses generated responsive to said second set of light flashes have a predetermined height.

4. The apparatus of claim 3 further comprising:
offset circuit means for subtracting from said amplified data signal a second electrical equal to the electrical pulses of said predetermined height generated responsive to said second set of light flashes.

5. The apparatus of claim 1 wherein the second set of light flashes has a gamma equivalent energy in the range of about 4.5 to about 6.5 MEV.

6. A method for measuring radiation in a borehole comprising:
providing in said borehole, a main scintillation crystal capable of scintillating responsive to the radiation to be measured;
embedding a reference scintillation crystal in one end of said main scintillation crystal;
inducing in said main scintillation crystal a first set of light flashes whose intensity is proportional to the intensity of said radiation to be measured;
inducing in said reference scintillation crystal a second set of light flashes of a predetermined intensity;
transmitting said first set of light flashes directly from said main scintillation crystal to a light sensing means optically coupled to said main scintillation crystal;
transmitting said second set of light flashes directly from said reference scintillation crystal to said light sensing means optically couled to said reference scintillation crystal;
with said light sensing means, generating electrical pulses responsive to the light flashes of said first and second set of light flashes, wherein the height of each of said generated electrical pulses is proportional to the intensity of a respective light flash of said first and second set of light flashes; and
transmitting said electrical pulses to a point removed from said borehole.

7. The method of claim 6 further comprising providing a layer of reflective material between said main scintillation crystal and said embedded reference scintillation crystal, and reflecting said second set of light flashes from said reflective material layer to said light sensing means.

8. The method of claim 6 further comprising:
with an amplifier means at said removed point, amplifying said electrical pulses to provide an amplified data signal;
sensing the height of the electrical pulses generated responsive to said second set of light flashes;
generating an electrical feedback signal responsive to changes in said sensed pulse height; and
responsive to said electrical signal, adjusting the gain of said amplifier means until the electrical pulses generated responsive to said second set of light flashes have a predetermined height.

9. The method of claim 8 further comprising:
subtracting from said amplified data signal a second electrical signal equal to the electrical pulses of said predetermined height generated responsive to said second set of light flashes.

10. The method of claim 6 wherein the second set of light flashes has a gamma equivalent energy in the range of about 4.5 to about 6.5 MEV.

11. A method for determining a borehole characteristic in an oil well comprising:
providing in said borehole a main scintillation crystal capable of scintillating responsive to gamma radiation;
embedding a reference scintillation crystal in one end of said main scintillation crystal;
with a source of neutrons, irradiating that portion of the borehole adjacent said main scintillation crystal;
inducing in said main scintillation crystal a first set of light flashes whose intensity is proportional to the intensity of gamma radiation induced in the oil well by said neutron irradiation;
inducing in said reference scintillation crystal a second set of light flashes of a predetermined intensity;
transmitting said first set of light flashes directly from said main scintillation crystal to a light sensing means optically coupled to sai main scintillation crystal;
transmitting said second set of light flashes directly from said reference scintillation crystal to said light sensing means optically coupled to said reference scintillation crystal;
with said light sensing means, generating electrical pulses responsive to the light flashes of said first and second set of light flashes, wherein the height of each of said generated electrical pulses is proportional to the intensity of a respective light flash of said first and second set of light flashes;
transmitting said electrical pulses to a point removed from said borehole; and
analyzing the electrical pulses generated responsive to said first set of light flashes with respect to the electrical pulses generated responsive to said second set of light flashes to determine a borehole characteristic.

12. The method of claim 11 further comprising providing a layer of reflective material between said main scintillation crystal and said embedded reference scintillation crystal, and reflecting said second set of light flashes from said reflective material layer to said light sensing means.

13. The method of claim 11 further comprising:
with an amplifier means to said removed point, amplifying said electrical pulses to provide an amplified data signal;
sensing the height of the electrical pulses generated responsive to said second set of light flashes;
generating an electrical feedback signal responsive to changes in said sensed pulse height; and
responsive to said electrical feedback signal, adjusting the gain of said amplifier means until the electrical pulses generated responsive to said second set of light flashes have a predetermined height.

14. The method of claim 13 further comprising:
subtracting from said amplified data signal a second electrical signal equal to the electrical pulses of said predetermined height generated responsive to said second set of light flashes.

15. The method of claim 11 wherein the second set of light flashes has a gamma equivalent energy in the range of about 4.5 to about 6.5 MEV.

16. An apparatus for determining a borehole characteristic in an oil well comprising: a main scintillation crystal capable of scintillating responsive to gamma radiation for giving a first set of light flashes whose intensity is proportional to the intensity of said gamma radiation;

a reference scintillation crystal embedded in one end of said main scintillation crystal including a monoenergetic source of radiation embedded therein, for giving a second set of light flashes of a predetermined intensity;

a source of neutrons for irradiating that portion of the oil well adjacent said main scintillation crystal and inducing gamma radiation therein;

light sensing means optically coupled to said main scintillation crystal and said reference scintillation crystal for generating electrical pulses responsive to the light flashes of said first and second set of light flashes, wherein the height of each of said generated electrical pulses is proportional to the intensity of a respective light flash of said first and second set of light flashes;

electrical data transmitting means electrically connected to said light sensing means for transmitting said electrical pulses to a point removed from said borehole; and means at said removed point for analyzing the electrical pulses generated responsive to said first set of light flashes with respect to the electrical pulses generated responsive to said second set of light flashes to determine a borehole characteristic.

17. The apparatus of claim 16 further comprising a layer of reflective material between said main scintillation crystal and said embedded reference scintillation crystal for reflecting said second set of light flashes from said reflective material layer to said light sensing means.

18. The method of claim 16 wherein said means for analyzing includes:

amplifier means for amplifying said electrical pulses to provide an amplified data signal;

spectrum stabilizer means for sensing the height of the electrical pulses generated responsive to said second set of light flashes and operable to generate an electrical feedback signal responsive to changes in said sensed pulse height; and automatic gain control means operable responsive to said electrical feedback signal for adjusting the gain of said amplifier means until the electrical pulses generated responsive to said second set of light flashes have a predetermined height.

19. The apparatus of claim 18 further comprising:

means for subtracting from said amplified data signal a second electrical signal equal to electrical pulses of said predetermined height generated responsive to said second set of light flashes.

20. The apparatus of claim 16 wherein the second set of light flashes has a gamma equivalent energy in the range of about 4.5 to about 6.5 MEV.

* * * * *

UNITED STATES PATENT AND TRADEMARK OFFICE
CERTIFICATE OF CORRECTION

PATENT NO. : 4,053,767
DATED : October 11, 1977
INVENTOR(S) : John G. Kampfer and Lucian A. Ingram It is certified that error appears in the above-identified patent and that said Letters Patent are hereby corrected as shown below:

Column 2, line 12, "subject" should read --surface--

Column 4, line 51, "substrate" should read --subtract--

IN THE CLAIMS

In claim 3, at column 7, line 1, "sensing" should read --sensed--

In claim 6, at column 7, line 35, "couled" should read --coupled--

In claim 8, at column 7, line 60, after electrical insert --feedback--

In claim 11, at column 8, line 21, "sai" should read --said--

In claim 13, at column 8, line 47, "to" should read --at--

Signed and Sealed this

Twenty-first Day of February 1978

[SEAL]

Attest:

RUTH C. MASON
Attesting Officer

LUTRELLE F. PARKER
Acting Commissioner of Patents and Trademarks